C. A. PARSONS & G. G. STONEY.
SEARCH LIGHT REFLECTOR.
APPLICATION FILED JUNE 13, 1910.
1,071,569.
Patented Aug. 26, 1913.
3 SHEETS—SHEET 1.
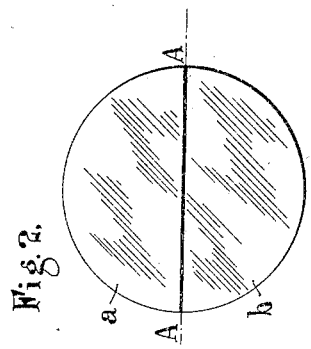
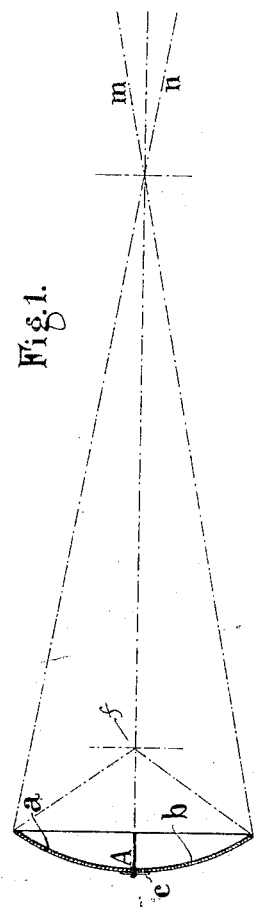
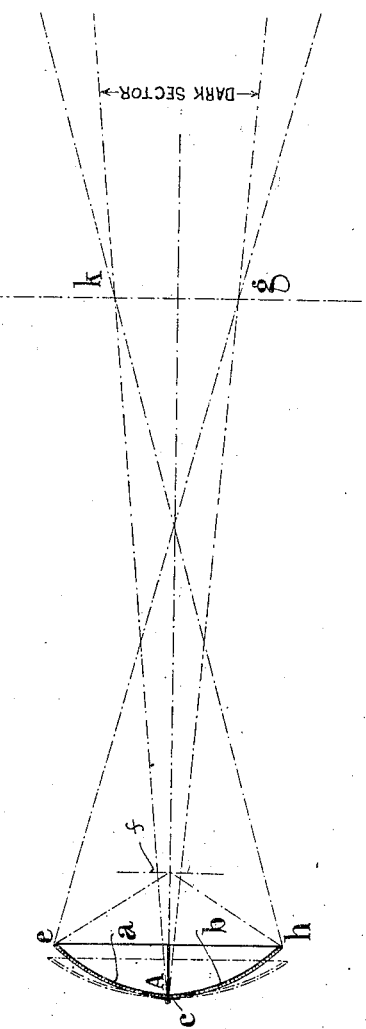
Inventors.
Charles A. Parsons
George G. Stoney.

C. A. PARSONS & G. G. STONEY.
SEARCH LIGHT REFLECTOR.
APPLICATION FILED JUNE 13, 1910.
1,071,569.
Patented Aug. 26, 1913.
3 SHEETS—SHEET 2.
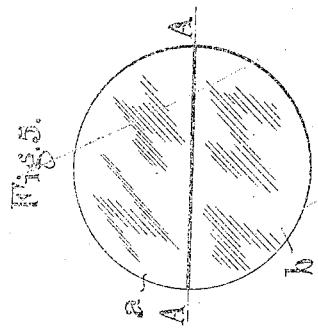
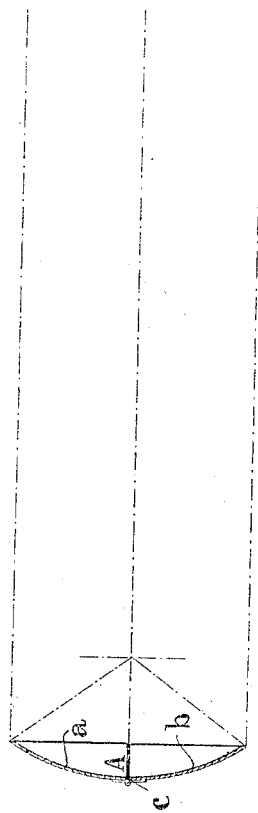
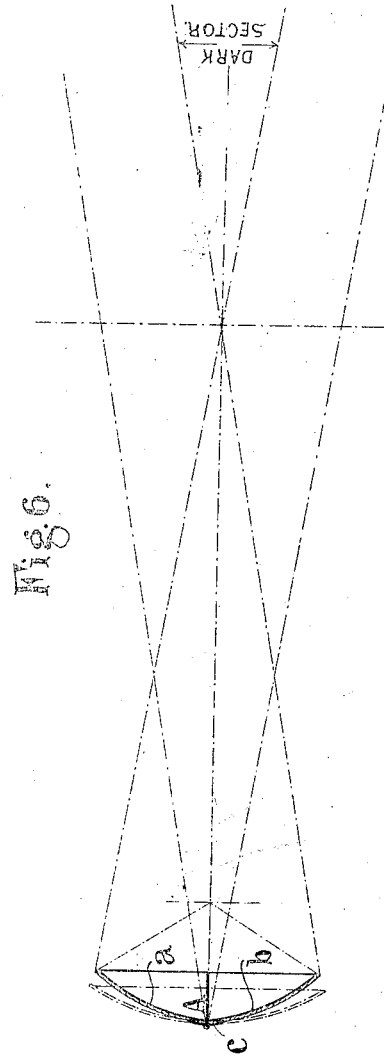
Inventors
Charles A. Parsons,
George G. Stoney,

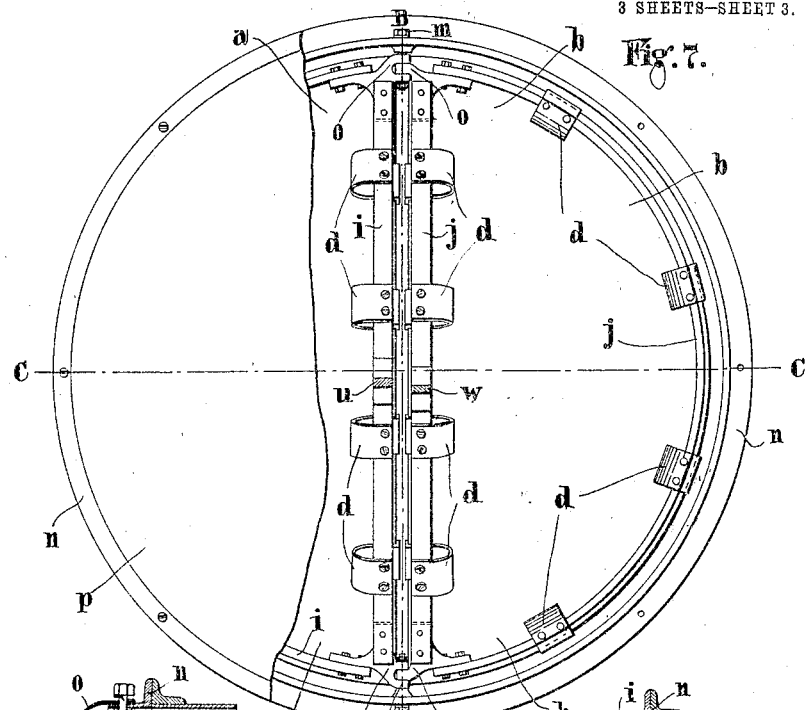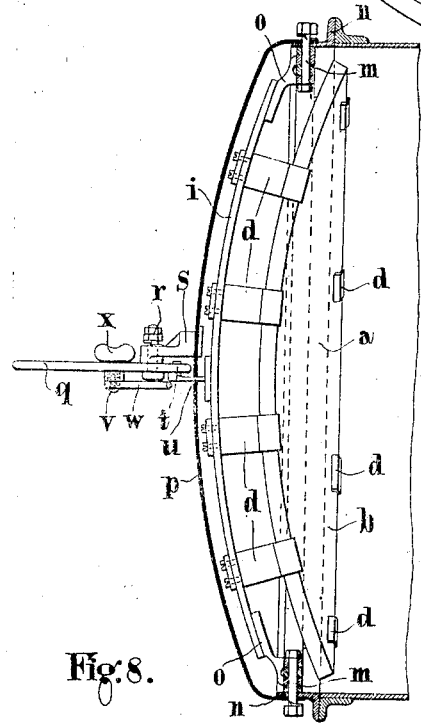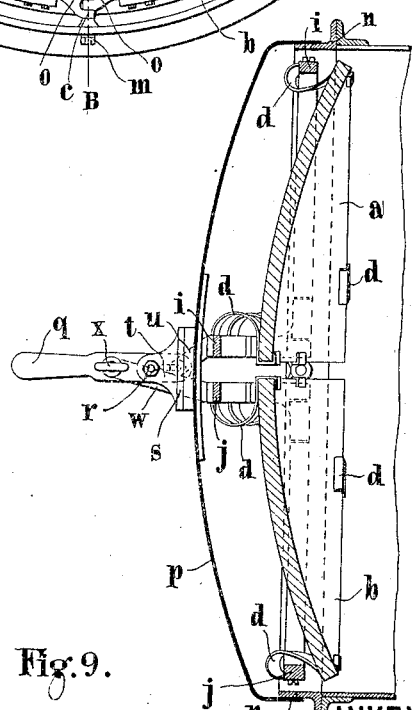

UNITED STATES PATENT OFFICE.

CHARLES ALGERNON PARSONS AND GEORGE GERALD STONEY, OF NEWCASTLE-UPON-TYNE, ENGLAND; SAID STONEY ASSIGNOR TO SAID PARSONS.

SEARCH-LIGHT REFLECTOR.

1,071,569.

Specification of Letters Patent.

Patented Aug. 26, 1913.

Application filed June 13, 1910. Serial No. 566,685.

*To all whom it may concern:*

Be it known that we, the Honorable CHARLES ALGERNON PARSONS, C. B., and GEORGE GERALD STONEY, subjects of the King of Great Britain and Ireland, both residing at Heaton Works, Newcastle-upon-Tyne, in the county of Northumberland, England, have invented certain new and useful Improvements in Search-Light Reflectors, of which the following is a specification.

This invention relates to improvements in reflectors for projectors and the like.

In some cases with projectors and search lights it is necessary to produce not only a beam of light collected from a luminous source which shall have practically equal illuminating power in all parts of the beam, but to produce a beam of light with a dark portion generally in the center of the beam or with a dark band across. For instance when ships are passing through the Suez Canal at night it is necessary to be able to illuminate the banks of the canal for navigation purposes but in order that an approaching ship may not be dazzled by the light of the projector the beam produced must have a dark center when another ship is approaching. This dark center has been obtained previously in various ways such as by a suitable shutter placed generally in front of the front glass of the projector. It is evident that this method entails the loss of a certain amount of light depending of course upon the area of the shutter. The same effect has also been produced by a dispersing lens provided with a suitable shutter or by a dispersing lens constructed to divide the beam and used either in conjunction with or independent of the ordinary dispersing lens. These latter methods however add to the number of operative elements in a projector each of which requires careful designing and mounting to obtain the required effect. They also add to the danger of the reflector being rendered useless by the fracture of any of its parts.

The object of the present invention is to provide a reflector which shall produce a beam of light having such dark portion or portions and be of simple and strong construction.

The invention consists for this purpose in dividing a reflector of any suitable curvature into a plurality of parts, these parts being so connected together that the angle between them can be varied whereby the light reflected from each part may be combined to form a single beam which may be of variable width or be made to form a plurality of beams.

The invention further consists in the improved reflectors hereinafter indicated.

Referring now to the accompanying drawings which form a part of the specification, Figure 1 and Fig. 3 are cross-sectional elevations of a parabola ellipse reflector adapted to give a single, and two wide reflected beams of light respectively, while Fig. 2 is a front elevation of the reflector in Fig. 1. Fig. 4 and Fig. 6 are cross-sectional elevations of a parabola reflector for producing a single, and two narrow reflected beams of light respectively, while Fig. 5 is a front elevation of the reflector in Fig. 4. Fig. 7 shows a rear view of the reflector with the details of the construction whereby it is held and moved. Fig. 8 shows a side elevation illustrating still further these details, this section being taken on line B—B of Fig. 7. Fig. 9 shows a like section on line C—C of Fig. 7.

In carrying the invention into effect according to one method as shown in Figs. 1, 2 and 3, a parabola ellipse reflector is divided into two separate parts, $a$ and $b$, preferably along a horizontal diameter A A, and separately mounted, the parts being connected together by a hinge as shown at, $c$, so that each part may swing about the hinge as axis. By this means it will be seen that the angle between the two parts, $a$ and $b$, can be varied from an angle to give the same beam of light as the original reflector to that necessary to give two beams having any desired angle between them. For example, in the reflector shown in Figs 1, 2 and 3, light from a luminous source, $f$, is reflected as converging beams of light, $e$, $e$, $g$, and $h$, $e$, $h$, from the parts, $a$ and $b$, of the reflector respectively. Each of these beams of light again diverges as shown at, $h$ and $g$, in a manner already well known and from two separate beams. It will thus be evident that the angle of divergence between these two reflected beams will depend on the angle between the parts, $a$ and $b$, of the reflector. The angle of divergence between the reflected beams can thus be altered by varying the angle between the reflector parts in any manner, and the beams can be separated from one another at any distance from the reflector, or brought together at the focus of the reflector taken as a whole, and so caused to form one divergent beam.

If desired the reflector may be divided into any number of parts which are separately mounted, these parts being suitably connected together, so as to form a reflector capable of giving several beams of light, the angles between which can be varied and all the beams combined to form one beam if desired.

The separate parts may be mounted in any desired manner and any suitable means may be provided for altering the angle between the parts to obtain any desired angle between the beams produced.

This invention may be applied to parabolic, elliptic or hyperbolic reflectors or to parabola-ellipse, parabola-hyperbola, hyperbola-ellipse reflectors or to a reflector of any other shape and curvature, the type of reflector used being determined by the shape of beam required. For instance if two narrow beams were required a parabola reflector as shown in Figs. 4, 5 and 6, would be used divided into two parts, $a$ and $b$, while if wider beams were required a parabola-ellipse reflector as shown in Figs. 1, 2 and 3 would be used, and with such a reflector a single beam of half the total width of the two beams can be obtained by causing suitable overlapping of the beams.

This invention is applicable to reflectors for all purposes of projection where reflectors are used to collect the light of a luminous source and it is desired to split the light thus concentrated into a number of portions, the angle between which can be varied. Thus the invention can well be applied to projectors used for stage lighting.

It will be seen that many modifications may be made in the method of carrying this invention into effect without in any way departing from the spirit of the same.

As an illustration of the details of practical supporting devices for the reflector parts, and referring to Figs. 7, 8 and 9, it will be observed that the reflector is shown in two parts, semi-circular, as shown in Fig. 7, and in the concave form in the other figures. These parts are held in two semi-circular frames $i$, $j$, which are supported at their ends upon hinge pieces $o$ to which they are connected by bolts, and the ears of which are hinged upon pivots $m$, the whole being connected to their support, as shown at $n$. Clips $d$ sustain the reflectors $a$ and $b$ upon these frames. Movement of the sections is controlled by a lever 2 mounted upon an arm $S$ by a pivot $r$, said arm being fixed upon the rear inclosing shell $p$. Lever $q$ is connected to the sections by arms $w$, $u$, (Figs. 8 and 9) so that both sections are moved simultaneously and equally in relation to each other.

Having now described our invention what we claim as new and desire to secure by Letters Patent is:—

1. A reflector composed of a plurality of parts all movable in interrelation, supporting means therefor, said parts having reflecting surfaces formed to reflect a single beam or multiple beams according to the designed relative adjustment of the said parts.

2. A reflector composed of two movable parts, supporting means therefor, each of said movable parts movable in relation to the other, the surfaces of said reflector parts being constructed and arranged to throw a single beam or distinct beams separated by a dark space.

3. A reflector composed of two equal parts each movable in relation to the other adjustable supporting means carrying said parts, the reflecting surfaces of said parts being constructed and arranged to throw a single or divided beam according to the designed relative adjustment of the parts.

4. A reflector comprising in combination a plurality of reflecting parts, supporting means and means connecting said parts thereto permitting angular movement of each part relatively to each other whereby the parts can be arranged to reflect a plurality of beams or a single beam.

5. A reflector comprising in combination two reflecting parts, supporting means, and means connecting said parts thereto, permitting angular movement of each part relatively to the other, whereby the parts can be arranged to reflect a single beam or two separate beams.

In testimony whereof, we affix our signatures in presence of two witnesses.

CHARLES ALGERNON PARSONS.
GEORGE GERALD STONEY.

Witnesses:
FREDERICK GORDON HAY BEDFORD,
ALBERT WILLIAM PARR.